United States Patent [19]

Tsutsui et al.

[11] Patent Number: 5,519,610

[45] Date of Patent: May 21, 1996

[54] CONTROL SYSTEM FOR AUTOMATIC TRANSMISSIONS WITH TEACHING AND AUTOMATIC MODES USING A NEURAL NETWORK

[75] Inventors: Hiroshi Tsutsui; Yoshihisa Yamamoto, both of Nishio, Japan

[73] Assignee: Aisin AW Co., Ltd., Japan

[21] Appl. No.: 314,498

[22] Filed: Sep. 28, 1994

[30] Foreign Application Priority Data

Sep. 29, 1993 [JP] Japan .................................. 5-243364

[51] Int. Cl.$^6$ .................................................... G06F 15/18
[52] U.S. Cl. .................. 364/424.1; 364/150; 364/151; 395/23; 395/905; 477/34
[58] Field of Search ............................... 364/424.1, 149, 364/150, 151; 395/20, 21, 22, 23, 905; 477/34, 904

[56] References Cited

U.S. PATENT DOCUMENTS

| | | | |
|---|---|---|---|
| 5,089,963 | 2/1992 | Takahashi et al. | 364/424.1 |
| 5,099,428 | 3/1992 | Takahashi | 364/424.1 |
| 5,162,997 | 11/1992 | Takahashi | 364/424.1 X |
| 5,285,523 | 2/1994 | Takahashi | 395/905 X |
| 5,363,027 | 11/1994 | Noguchi | 364/424.1 X |
| 5,410,477 | 4/1995 | Ishii et al. | 395/905 X |

FOREIGN PATENT DOCUMENTS

| | | |
|---|---|---|
| 0513424 | 11/1992 | European Pat. Off. . |
| 3933295 | 4/1990 | Germany . |
| 4033574 | 8/1991 | Germany . |
| 62-261745 | 11/1987 | Japan . |
| 2134451 | 5/1990 | Japan . |
| 2240194 | 7/1991 | United Kingdom . |

*Primary Examiner*—Collin W. Park
*Attorney, Agent, or Firm*—Lorusso & Loud

[57] ABSTRACT

A control system for an automatic transmission, which can easily achieve a variety of shift patterns according to the taste of a driver and the road conditions. The control system includes: a neural network; and a mode switch for selecting either a teaching mode or an automatic mode. The neural network learns in the teaching mode and neuro-computes to output a gear ratio in the automatic mode. Tolerance error is computed from at least one of a propriety of a teaching gear ratio, a compatibility of an input value and a compatibility of the teaching gear ratio. A learning pattern is produced during the teaching mode for correcting load factors of the neural network which, in the automatic mode, outputs a gear ratio used to determine shifting of the transmission.

5 Claims, 7 Drawing Sheets

$C_x = 15 \quad A = 50(\%)$

|  | $A_1$ | $A_2$ | $A_3$ | $A_4$ | $A_5$ | $A_6$ |
|---|---|---|---|---|---|---|
| A | 30 | 40 | 50 | 60 | 70 | 80 |
| $\mu_A$ (A) | 0.36 | 0.69 | 1.00 | 0.69 | 0.36 | 0.20 |

FIG. 10

$C_x = 16 \quad v = 70 \text{ (km/h)}$

|  | $v_1$ | $v_2$ | $v_3$ | $v_4$ | $v_5$ | $v_6$ |
|---|---|---|---|---|---|---|
| v | 50 | 60 | 70 | 80 | 90 | 100 |
| $\mu_v$ (v) | 0.39 | 0.71 | 1.00 | 0.71 | 0.39 | 0.22 |

FIG. 11

|  | $A_2$ | $A_3$ | $A_4$ |
|---|---|---|---|
| $v_2$ | 0.69 | 0.71 | 0.69 |
| $v_3$ | 0.69 | 0.735 | 0.69 |
| $v_4$ | 0.69 | 0.71 | 0.69 |

FIG. 12

CONTROL SYSTEM FOR AUTOMATIC TRANSMISSIONS WITH TEACHING AND AUTOMATIC MODES USING A NEURAL NETWORK

BACKGROUND OF THE INVENTION

1. Field of the Invention

The present invention relates to a control system for an automatic transmission.

2. Description of the Related Art

In the prior art, shifting gears in an automatic transmission is typically controlled responsive to detected vehicle speed and throttle opening. In this kind of automatic transmission, however, shifts always follow the same set shift pattern, and the taste of the driver cannot be accommodated. Worse, the shifting pattern cannot be adapted to different road conditions, e.g., a road surface having a changing coefficient of friction or roads over mountainous terrain.

Thus, there has been proposed a control system for an automatic transmission, which provides for modification of a shift pattern in accordance with the taste of the driver or in accordance with the variations in the nature of the road (as disclosed in Japanese Patent Laid-Open No. 261745/1987). In this latter case, the automatic transmission is equipped with a manual shift lever so that the operator can manually execute a shift at a predetermined shift point while the vehicle is running. In response to this manual shift, the control system reads data of the vehicle speed and the throttle opening, compares this data with data for a fundamental shift pattern, and computes a constant in proportion to the difference. This constant is thereafter applied to produce a corresponding change in the fundamental shift pattern. By this manual shifting operation, a new shift pattern can be established in accordance with the taste of the driver or the nature of the road conditions.

Also there has been proposed a control system for an automatic transmission, which corrects the shift pattern by dialogue (voice simulation and voice recognition as disclosed in Japanese Patent Laid-Open No. 134451/1990). In this case, the control system of the automatic transmission corrects the shift pattern by conducting a dialogue with the driver and interpreting the answers of the driver by fuzzy logic. Specifically, the control system of the automatic transmission corrects the shift pattern by fuzzy inference of the driver's answers, by computing a correction coefficient from the inferred answers, and by multiplying the vehicle speed by the correction coefficient so that the shift point is determined by the product of the vehicle speed and the correction coefficient.

In the prior art automatic transmission control system in which the shift pattern is modified by a manual shifting operation, the fundamental shift pattern is changed by a single constant of proportion. Thus, one shift operation from a first selected gear to a second selected gear can be set according to the driver's taste or the road conditions, but shift operations other than from the first selected gear to the second selected gear are not necessarily set according to the driver's taste or the road conditions. Further in case the shifting pattern is to be changed in accordance with the road conditions, it is difficult by manual shifting to properly set the new shift pattern for the actual road conditions. Specifically, the driver will not always manually shift at the same shift point because the shift point varies to a certain extent. Moreover, the driver may shift at an improper time so that the shift pattern is changed to the data of the vehicle speed and the throttle opening at an improper shift point for the present road conditions.

Similarly in the prior art shift control which is set by dialogue, a single correction coefficient is computed from the dialogue answers by the fuzzy inference so that the shift pattern is corrected to correspond to this single correction coefficient. As a result, what is obtained is only one shift pattern but not a variety of shift patterns according to the driver's taste and the road situations.

Also, the correction coefficient derived by fuzzy inference is based on only the variables of vehicle speed and throttle opening so that the shift pattern intended by the driver is difficult to achieve. If the number of variables would be increased, more questions would have to be answered by the driver in the dialogue. As the number of questions increases, the driver requires more special knowledge of the vehicle and the road conditions so that the driver finds it increasingly difficult to properly answer the questions.

SUMMARY OF THE INVENTION

The present invention has as an object the solution of the aforementioned problems concomitant with a conventional control system for an automatic transmission and the provision of a control system for an automatic transmission, which system can easily establish a variety of shift patterns according to the taste of a driver and the road conditions.

According to one aspect of the present invention, a control system for an automatic transmission has teaching and automatic modes wherein shifting is manually selected by the driver during the teaching mode and wherein changes in detected running conditions of the vehicle cause a shift during the automatic mode. This system includes sensors for detecting the running conditions of the vehicle; a neural network adapted to receive the detected running condition values from the sensor and to output an automatic gear ratio in which each of the plurality of detected values is weighed by combined load factors; a gear stage converter for converting the automatic gear ratio output from said neural network into an automatic gear stage demand; a manual gear shift for being operated by a driver to select a teaching gear stage; mode switch means for selecting either the teaching mode in which a shift is performed in response to the teaching gear stage demand or the automatic mode in which the shift is performed in response to the automatic gear stage demand; a gear ratio converter for converting the teaching gear stage demand into a teaching gear ratio; a tolerance error computer for computing a tolerance error for correction of the combined load factors of the neural network on the basis of at least one of the propriety of the teaching gear ratio, the compatibility of running condition values, and the compatibility of the teaching gear ratio; a pattern producer for producing a learning pattern which is composed of the running condition values, the teaching gear ratio and the tolerance error; and a combined load factor corrector for correcting the combined load of said neural network on the basis of the pattern producer.

Thus when the neural network receives the detected values of the sensors as its input, the neural network outputs the automatic gear ratio by performing neuro-computation on the basis of the input. The neural network learns in the teaching mode and performs the neuro-computation in the automatic mode to output the gear ratio. Moreover, the neural network learns according to the learning pattern, which is composed of the input, the teaching gear ratio and the tolerance error, to output the automatic gear ratio. The neural network ends its learning when the errors of the automatic gear ratio and the teaching gear ratio are converged to the tolerance error.

In this case, the tolerance computed on the basis of at least one of the propriety of the teaching gear ratio, the compatibility of the input value and the compatibility of the teaching gear ratio. As a result, the neural network will not have its learning function degraded even if the learning is insufficient because of a possibility distribution or a shortage of the input.

BRIEF DESCRIPTION OF THE DRAWINGS

FIG. 10 is a diagram illustrating the compatibility of input values in the embodiment of FIGS. 1 and 2 when a detected value is exemplified by an accelerator opening.

FIG. 11 is a diagram illustrating the compatibility of input values in the embodiment of FIGS. 1 and 2 when the detected value is exemplified by a vehicle speed.

FIG. 12 is a diagram illustrating the compatibility of a subject in the embodiment of FIGS. 1 and 2.

DESCRIPTION OF THE PREFERRED EMBODIMENT

An embodiment of the present invention is described in detail with reference to the accompanying drawings.

Figure 1:
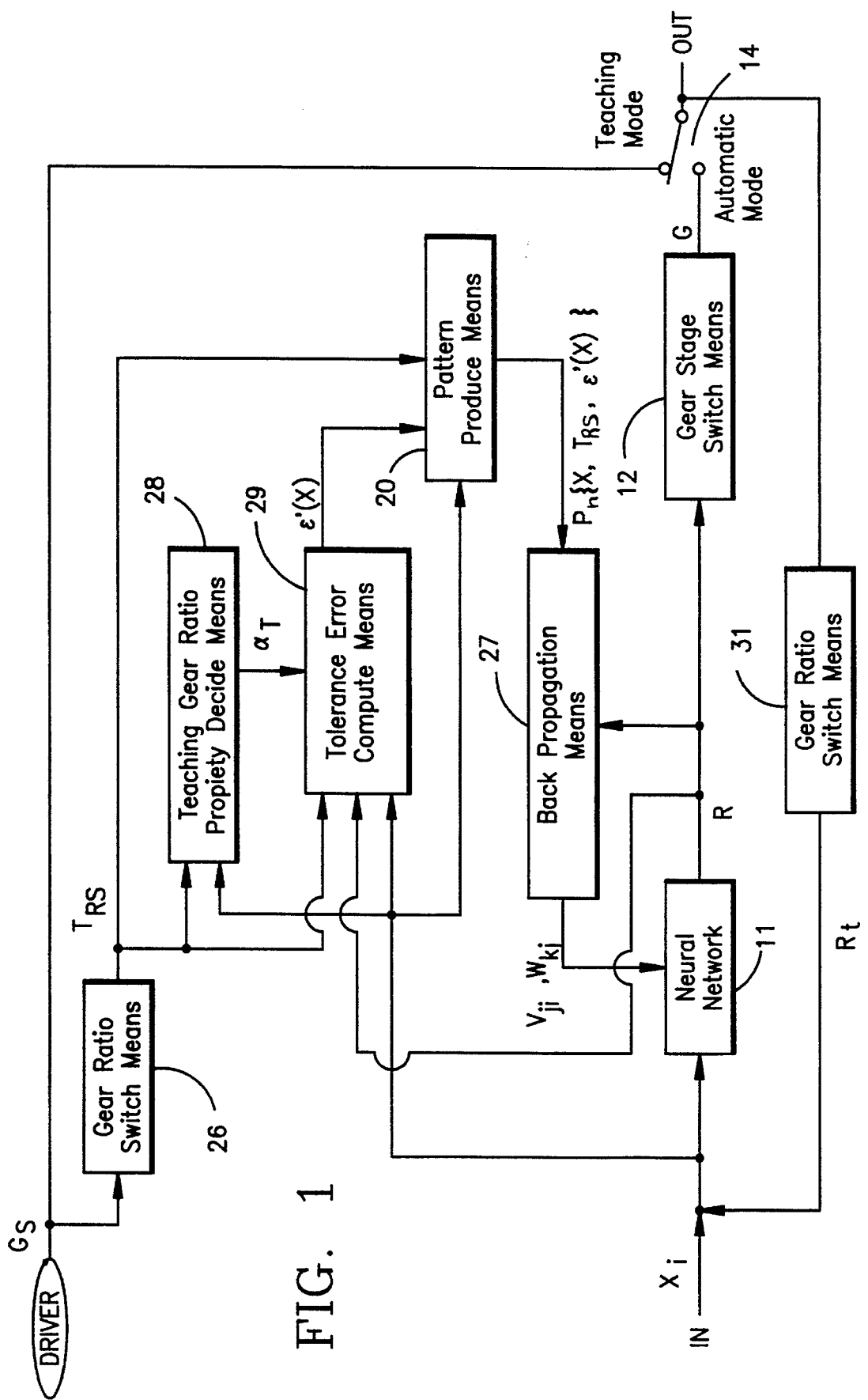
FIG. 1 is a block diagram showing a control system for an automatic transmission according to one embodiment of the present invention.

In FIG. 1, reference numeral 11 is a neural network which is formed by coupling a number of neurons. In response to input values $X_i$ detected by a plurality of conventional sensors (not shown), the neural network 11 outputs a gear ratio R. Numeral 12 designates a gear stage converter or converting means which converts the gear ratio R output from the neural network 11 into an automatic gear stage demand G, and numeral 14 designates a mode switch or switching means for switching between a teaching mode and an automatic mode.

The gear stage is selected automatically in the automatic transmission mode in accordance with the detected running conditions of the vehicle and is selected manually in the teaching mode by the driver operating a shift such as a shift lever (not shown) or a control switch (not shown) according to the running conditions of the vehicle and the road conditions.

When a shift is performed by the driver while the teaching mode is selected by the mode switch 14, a teaching gear stage demand $G_s$ is output through the mode switch 14 to a CPU (not shown). The CPU turns ON/OFF solenoids (not shown) corresponding to the teaching gear stage $G_s$ so that the working oil is fed/drained to/from hydraulic servos (not shown) of a hydraulic circuit (not shown). When a hydraulic servo is fed/drained with the oil, the corresponding frictional engagement elements are applied and/or released to establish an intended gear stage.

In the automatic transmission mode selected by the mode switch 14, the gear stage demand G output from the gear stage converter 12 is output through the mode switch 14 to the CPU (not shown).

Additionally in the teaching mode, the pattern producer 20 produces a learning pattern $P_n$, to teach the neural network 11 to correct the shift pattern which is set initially to initial values. The learning pattern $P_n$ has a teaching input X, which is generated from the input values $X_i$ when the driver performs the shifting operation, and a teaching gear ratio $T_{RS}$ as the teaching signal. The neural network 11 ends its learning when an error $E_P$ between the gear ratio R and the teaching gear ratio $T_{RS}$ satisfies a predetermined converging condition.

A gear ratio converter or gear ratio converting means 26 converts the teaching gear stage demand $G_s$, which is selected by the driver's shifting operation, into the teaching gear ratio $T_{RS}$. This teaching gear ratio $T_{RS}$ and the input values $X_i$ are input to the pattern producer or pattern producer means 20 to produce the learning pattern $P_n$ which is composed of: the teaching input value X produced on the basis of the input value $X_1$, the teaching gear ratio $T_{RS}$ and a tolerance error $\epsilon'(X)$.

In back propagation generator or back propagation means 27 acting as the combined load factor correcting means, combined load factors $V_{ji}$ and $W_{kj}$ are repeatedly corrected by the learning pattern $P_n$ and the gear ratio R so that the error $E_P$ between the gear ratio R output by the neural network 11 and the teaching gear ratio $T_{RS}$ is determined at each correction.

The teaching gear stage demand $G_s$ is selected when the driver performs a shifting operation. The timing of this shifting operation is selected by the driver in accordance with the driver's taste, present road conditions and environmental conditions such as the weather.

In teaching gear ratio propriety deciding means 28, the teaching gear ratio $T_{RS}$ is evaluated in terms of fuel economy, driving force and comfort to determine a propriety $\alpha_T$ of the teaching gear ratio. This makes it possible to prevent the gear ratio R output from the neural network 11 from being deteriorated by a bad teaching signal.

In the teaching mode, the driver performs a shifting operation while the input values $X_i$ are read. These input values have a possibility distribution. Also a possibility distribution is present in the teaching gear ratio $T_{RS}$ which is selected by the shifting operation. Thus, there is provided tolerance error computing means 29 for determining the tolerance error $\epsilon'(X)$ by using fuzzy inference while considering compatibility based upon the possibility distribution of the teaching signal and compatibility based upon a shortage of the learning data. As a result, the neural network 11 can have its learning function prevented from being degraded when the teaching signals are improbable or the data is unreliable because the learning is insufficient.

Numeral 31 designates a gear demand converter or converting means for converting the gear stage demands G and $G_s$ from the mode switch means 14 into a gear ratio $R_t$, to input the gear ratio $R_t$ as an input to the values $X_i$ to the neural network 11.

Figure 2:
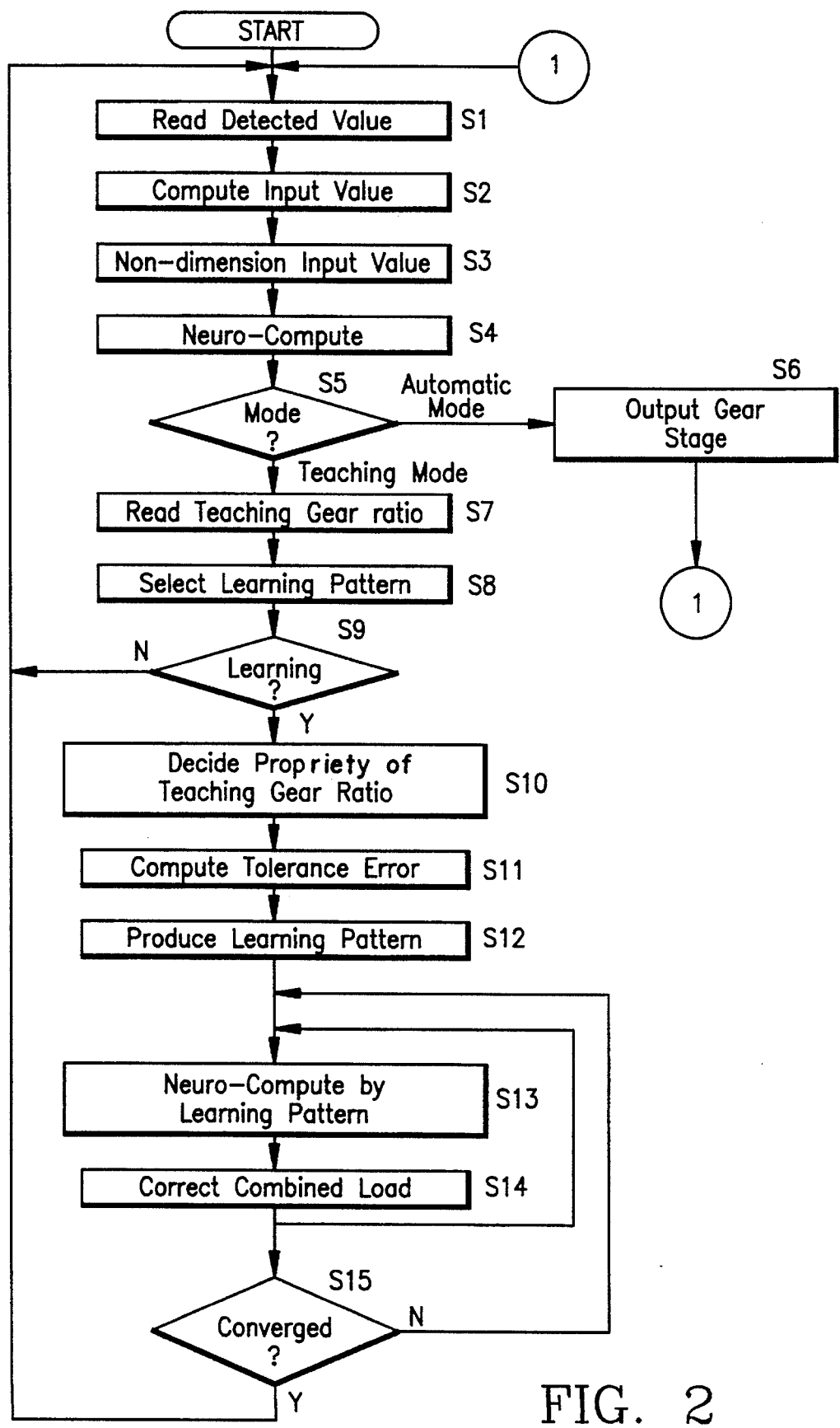
FIG. 2 is a flow chart showing the control system of the automatic transmission according to on variation of the embodiment of FIG. 1.

The operation of the control system thus constructed for the automatic transmission is illustrated by the steps shown in FIG. 2.

Step S1: The detected values of the individual sensors (not shown) are read in the CPU (not shown).

Step S2: The input values $X_i$ are computed.

Step S3: The computed input values $X_i$ are normalized (non-dimensioned).

Step S4: The neural network 11 (as shown in FIG. 1) performs a neuro-computation of the gear ratio R.

Step S5: It is decided whether the mode is the automatic mode or the teaching mode. The routine advances to Step S6 for the automatic mode and to Step S7 for the teaching mode.

Step S6: The gear stage converting means 12 outputs the gear stage demand G, and the routine returns to Step 1. A shift is not effected if the gear stage demand G is identical to the present gear, but otherwise a shift is effected.

Step S7: The teaching gear ratio $T_{RS}$ is read.

Step S8: The learning pattern $P_n$ when significantly different is changed. The input values $X_i$ are not learned when changes are insignificant from the corresponding values in $P_n$, because any further learning is unnecessary.

Step S9: It is decided whether or not the learning pattern $P_n$ is to be learned. The routine advances to Step S10, if the answer is YES, but otherwise returns to Step S1.

Step S10: The teaching gear ratio propriety deciding means 28 decides the propriety of the teaching gear ratio $T_{RS}$.

Step S11: The tolerance error $\epsilon'(X)$ is computed while considering the compatibility of the teaching signal and the compatibility based upon a short age of learning data.

Step S12: The pattern producing means 20 produces the learning pattern $P_n$.

Step S13: The neural network 11 neuro-computes the ear ratio R according to the learning pattern $P_n$.

Step S14: The back propagation means 27 corrects the combined loads $V_{ji}$ and $W_{kj}$. Steps S13 and 14 are repeated till the learning of all the learning patterns $P_n$ is ended.

Step S15: It is decided whether or not the error $E_P$ between the gear ratio R and the aforementioned teaching gear ratio $T_{RS}$ has been converged under a predetermined converging condition. The routine returns to Step S1 if the answer is YES and otherwise to Step S13.

In the neural network 11, the input values $X_i$ are input in the automatic mode and the teaching mode to the neural network 11 so that values $X_i$ are used for neuro-computing the gear ratio R. In the teaching mode, the values $X_i$ are also used for converging the error $E_P$ between the automatic gear ratio R and the teaching gear ratio $T_{RS}$. For these operations, the detected values are detected by the individual sensors (not shown) and are read by the CPU (not shown), where they are subjected to the predetermined computations to normalize or non-dimension the values.

The detected values to be detected by the sensors are exemplified by an accelerator opening A, a brake depression B, a steering angle S, a vehicle speed v, a present gear ratio $R_t$, the preceding gear ratio $R_{t-1}$, a running resistance DR and a coefficient of friction LR of a road surface, so that the input values $X_i$ are computed from these detected values. The detected values can be used as they are as the input values $X_i$.

Alternatively, quantities of change or first derivatives of the input values can be used in place of, or in addition to the normalized detected values, as input values $X_i$. For example, the input values $X_i$ can include the accelerator operating speed dA as the quantity of change of the accelerator opening A, the brake operating rate dB as the quantity of change of the brake depression B, the steering operating rate dS as the quantity of change of the steering angle S, and the acceleration dv as the quantity of change of the vehicle speed v.

The input value $X_i$ can further employ: the number of brake depressions NB 100 [m] ahead of the shift point, as expressed by equation (1):

$$NB = \frac{\text{BRAKE DEPRESSION NO.}}{100 \text{ [minutes]}} \tag{1}$$

the average speed $V_A$ for a running time period of 5 mins., as expressed by equation (2)

$$V_A = \frac{\int v dt}{5 \text{ [minutes]}} \tag{2}$$

the average acceleration $dv_A$ for a running time period of $\Delta t$, as expressed by equation (3):

$$dV_A = \int \left[ -\frac{\partial v}{\partial t} \right] dt/t\Delta t \tag{3}$$

and the average accelerator opening $dA_A$.

Subsequently, the input values $X_i$ are normalized or non-dimensioned as shown in equations (4) through (15) wherein the subscript "max" indicates the maximums of the individual detected values.

$$X_1 = A[\%]/100[\%] \tag{4}$$

$$X_2 = B[\%]/100[\%] \tag{5}$$

$$X_3 = S[°]/60[°] \tag{6}$$

$$X_4 = v[km/h]/150[km/h] \tag{7}$$

$$X_5 = dA[\%/s]/dA_{max}[\%/s] \tag{8}$$

$$X_6 = dB[\%/s]/dBmX[\%/s] \tag{9}$$

$$X_7 = dS[°/s]/dS_{max}[°/s] \tag{10}$$

$$X_8 = dv[m/s^2]/dv_{max}[m/s^2] \tag{11}$$

$$X_9 = NB[\%]/NB_{max}[\%] \tag{12}$$

$$X_{10} = V_A[km/h]/V_{Amax}[km/h] \tag{13}$$

$$X_{11} = dv_A[m/s]/dv_{Amax}[m/s] \tag{14}$$

$$X_{12} = dA_A[\%/s]/dA_{Amax}[\%/s] \tag{15}$$

The input values $X_1$ thus normalized are input to the neural network 11.

Figure 3:
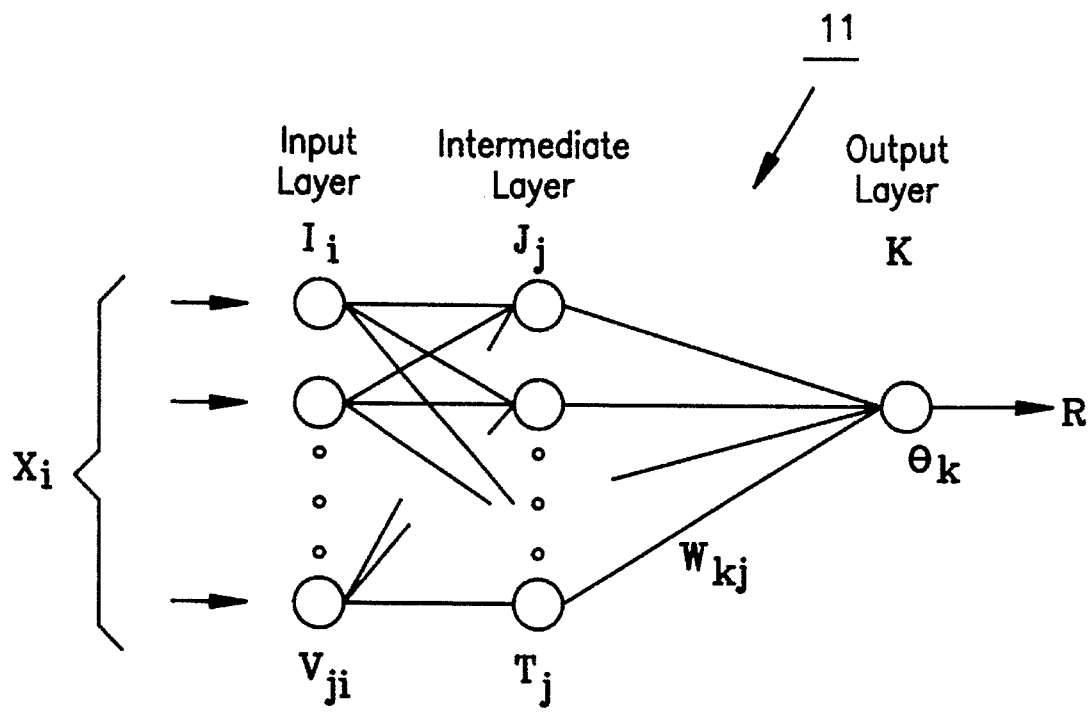
FIG. 3 is a diagram illustrating the concept of a neural network in another variation of the embodiment of FIG. 1.

In FIG. 3, $X_i$ designates the detected running condition values and other input values input to the neurons of the input layer; $I_i$ designates outputs of the input layer which are input to the neurons of the intermediate layer; $J_j$ designates the output signals of the intermediate layer which are input to the output layer; and K designates an output signal from the output layer. $V_{ji}$ designate the load factors of the input layer used to produce the signals $I_i$; $W_{kj}$ designates the load factors of the intermediate layer used to produce the signals $J_j$; and $\gamma_j$ and $\theta_k$ designate quantities of offset.

In the neural network 11, as expressed by the individual equations (16) to (19), the input values $X_i$ are input to the neurons of the input layer and are weighted by the load factors $V_{ji}$ to generate the input signals $I_i$ to the neurons of the intermediate layer. Moreover, the signals $I_i$ input to each neuron of the intermediate layer are weighted by the load factors $W_{kj}$ to generate the resultant input signals $J_j$ to the neurons of the output layer so that the output signal K is output from the output layer. In the described embodiment, the output signal K is the gear ratio R.

$$I_i = X_i \tag{16}$$

where i=1 to m $$J_j = \sum_{i=1}^{m} V_{ji} I_i + \gamma_j \tag{17}$$

where j=1 to n $$K = \sum_{j=1}^{n} W_{kj} f(J_j) + \theta_k \tag{18}$$

and $$R = f(K) \tag{19}$$

The output signal K and gear ratio R are given by a sigmoid function f(X), as expressed by equation (20)

$$f(x) = \frac{1}{1 + \exp\left(\frac{-x}{u_o}\right)} \tag{20}$$

where $u_o$ designates a coefficient of gradient of the sigmoid function f(x).

Figure 4:
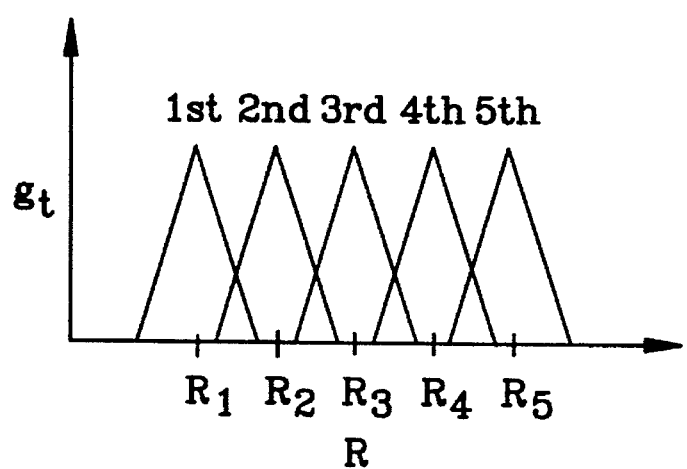
FIG. 4 is a diagram illustrating a degree of satisfaction of a gear stage converter in the embodiment of of FIGS. 1 and 2.

In the gear stage converting means 12 (as shown in FIG. 1), the gear ratio R output from the neural network 11 is input to and converted by the gear stage converting means 12 into the gear stage demand G. FIG. 4 is a diagram illustrating the degree of satisfaction of the gear stage converting means in the described embodiment. In FIG. 4, the abscissa indicates the gear ratio R, and the ordinate indicates the degree of satisfaction $g_t$ of each gear stage G. $R_1$ to $R_5$ designate the ratios of the individual gear stages G, i.e., the gear ratios of the 1st to 5th gears. The degree of satisfaction $g_t$ is given for each gear stage G by the following Equation:

$$g_t = \mu_t(R) \tag{21}$$

where t=1 to 5.
The gear stage G corresponding to the maximum degree of satisfaction gt is selected.

The teaching gear ratio propriety deciding means 28 (as shown in FIG. 1) decides the propriety $\alpha_T$ of the teaching gear ratio $T_{RS}$ from the teaching gear ratio $T_{RS}$ output of the gear ratio converting means 26 and the input value $X_1$. First, a fuel economy matching degree $M_f$, a driving force matching degree $M_F$ and a comfort matching degree $M_C$ are computed in accordance with the individual equations (22) to (24). Then the propriety $\alpha_T$ of the teaching gear ratio $T_{RS}$ is computed on the basis of those matching degrees by the equation (25).

$$M_f = \int_{t_1}^{t_2} |T_{RS} - R_f| dt / M_{fmax} \tag{22}$$

$$M_F = \int_{t_1}^{t_2} \left( \frac{\Delta dv}{\Delta A} \cdot \frac{dv + DR/w}{A} \right) dt / M_{Fmax} \tag{23}$$

$$M_C = \int_{t_1}^{t_2} |T_{RS} - R_C| dt / M_{Cmax} \tag{24}$$

$$\alpha_T = \max(1 - M_f, M_F, 1 - M_C) \tag{25}$$

$M_{fmax}$, $M_{Fmax}$ and $M_{Cmax}$ designate constants for normalizing (non-dimensioning) the fuel economy matching degree $M_f$, the driving force matching degree $M_F$ and the comfort matching degree $M_C$, respectively; $R_f$ designates a fuel economy optimizing gear ratio; w designates a vehicle mass; and $R_C$ designates a comfort optimizing gear ratio.

The fuel economy matching degree $M_f$ is an index indicating the degree of deterioration of the fuel economy, which degree of deterioration increases as it deviates from the economy optimizing gear ratio $R_f$.

The driving force matching degree $M_F$ is determined by multiplying the degree of achievement of the quantity of acceleration increase $\Delta dv$ with respect to the degree of accelerator operation $\Delta A$ by the degree of achievement of the substantial acceleration (dv+DR/W) with respect to the accelerator opening A, and by integrating the product for the time period of $t_1$ to $t_2$. The driving force matching degree $M_F$ thus determined is an index indicating the responsiveness of the vehicle to the degree of accelerator operation $\Delta A$ for the time period of $t_1$ to $t_2$. Unless a sufficient acceleration dv is achieved, the driving force matching degree $M_F$ decreases. Alternatively in equation (23), the degree of achievement of the increase in the acceleration $\Delta dv$ for the degree of accelerator operation $\Delta A$ may be exclusively integrated.

The comfort matching degree $M_C$ is an index indicating the degree of deterioration of comfort. The comfort matching degree $M_C$ increases in value as it deviates from the comfort optimizing gear ration $R_C$.

The tolerance error compute means 29 is fed with the input value $X_1$, the teaching gear ratio $T_{RS}$, the gear ratio R and the propriety $\alpha_T$ and evaluates the subject "the teaching gear ratio is set to $T_{RS}$ for the input values $X_i$," to compute the compatibility $\beta_T$ of the subject. Therefore, the tolerance error computing means 29 computes both the compatibility based upon a possibility distribution of the teaching signal and the compatibility based upon a shortage of the learning data, by the equations (26) through (29). In this case, the compatibility based upon the possibility distribution of the teaching signal can be expressed by the compatibility (as will be called the "compatibility of the input value $X_i$") $\mu_x(X_i)$ having the input value $X_i$, and the compatibility based upon the shortage of the learning data can be expressed by the compatibility (as will be called the "compatibility of the teaching gear ratio $T_{RS}$") $\mu_T(T_{RS})$ having the teaching gear ratio $T_{RS}$ for the input value $X_i$.

Subsequently, the tolerance error compute means 29 computes the tolerance error $\epsilon'(X)$ on the basis of the compatibility $\beta_T$ of the subject and the propriety $\alpha_T$ of the teaching gear ratio $T_{RS}$.

Figure 5:
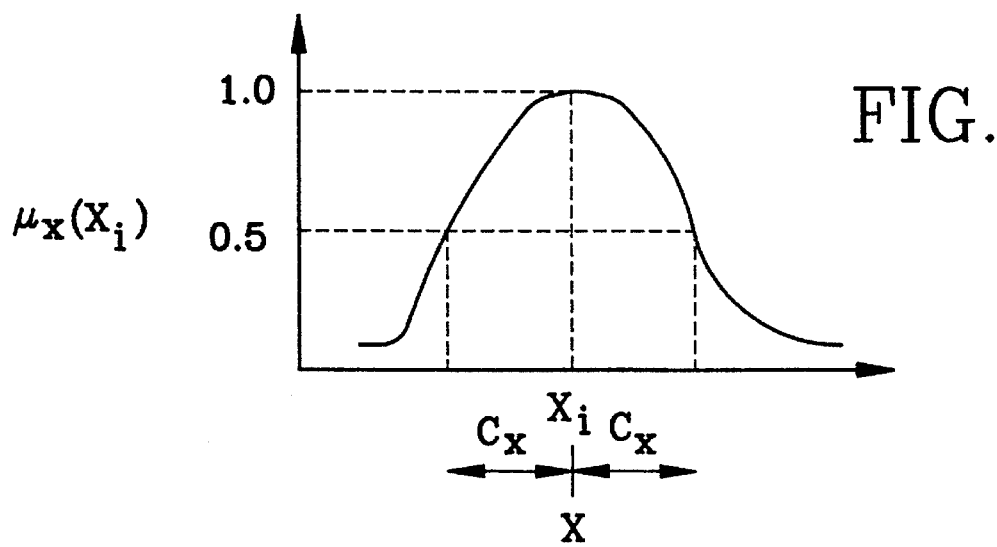
FIG. 5 is a diagram illustrating the compatibility of an input value in the embodiment of FIGS. 1 and 2.
Figure 6:
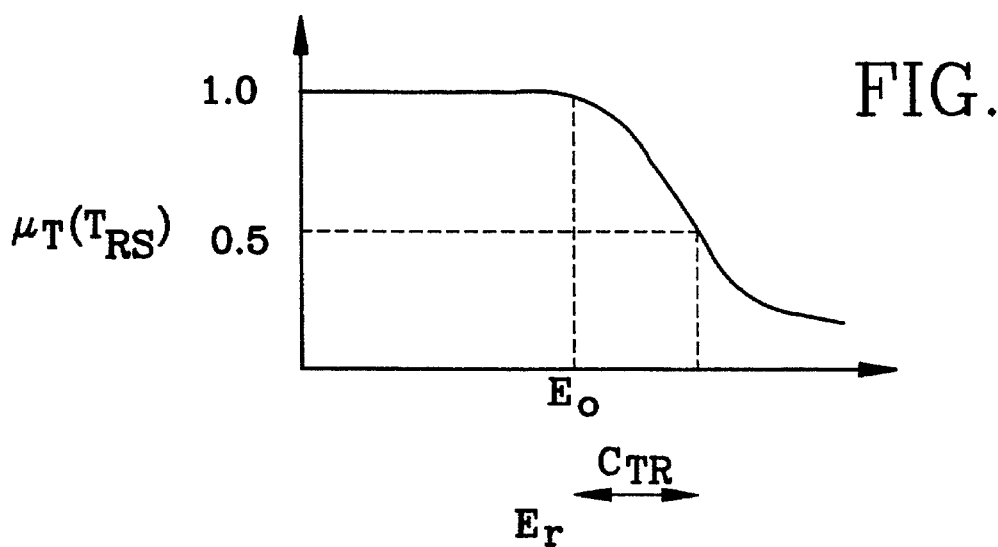
FIG. 6 is a diagram illustrating the compatibility of a teaching gear ratio in the embodiment of the FIGS. 1 and 2.
Figure 7:
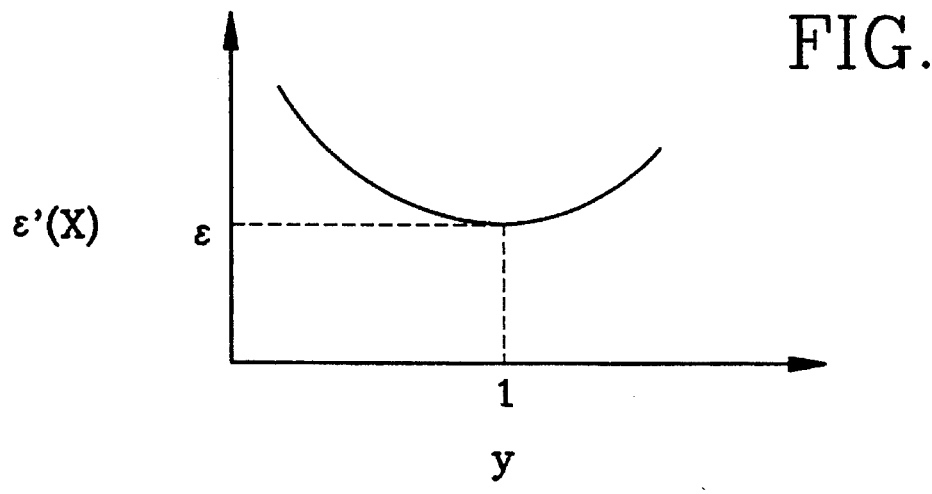
FIG. 7 is a diagram illustrating a tolerance error in the embodiment of FIGS. 1 and 2.

In FIG. 5, the abscissa indicates the input value $X_i$, and the ordinates the compatibility $\mu_x(X_i)$ of the input value $X_i$. In FIG. 6, the abscissa indicates the teaching gear ratio $T_{RS}$, and the ordinates indicates the compatibility $\mu_T(T_{RS})$. In FIG. 7, the abscissa indicates the compatibility y of the tolerance error $\epsilon'(X)$, and the ordinate indicates the tolerance error $\epsilon'(X)$.

The compatibility $\mu_x(X_i)$ of the input value $X_i$ can be expressed by the following fuzzy function, equations (26) and (27), as plotted by the curve of FIG. 5:

$$\mu_x(X_i) = 1 - \frac{1}{1 + \left(\frac{C_x}{X_i - X}\right)^2} \quad (26)$$

for $X \neq X_i$ and $$\mu_x(X_i) = 1 \quad (27)$$

for $X = X_i$.

$C_x$ designates a constant for setting the difference between the input value $X_i$, at which the compatibility $\mu_x(X_i)$ is 1, and the input value $X_i$ at which the same is 0.5.

The compatibility $\mu_T(T_{RS})$ of the teaching gear ratio $T_{RS}$ increases as the error $E_P$ between the gear ratio R output by the neural network 11 (as shown in FIG. 1) and the teaching gear ratio $T_{RS}$ increases. Therefore, the compatibility $\mu_T(T_{RS})$ of the teaching gear ratio $T_{RS}$ can be expressed by the following fuzzy function, equations (28) and (29), as plotted by the curve of FIG. 6:

$$\mu_T(T_{RS}) = 1 - \frac{1}{1 + \left(\frac{C_{TR}}{E_o - E_P}\right)^2} \quad (28)$$

for $E_o < E_P$, and $$\mu_T(T_{RS}) = 1 \quad (29)$$

for $E_o < E_P$.

$C_{TR}$ designates a constant for setting the difference between the minimum $E_o$ of the error $E_P$ and the error $E_P$ at which the compatibility $\mu_T(T_{RS})$ of the teaching gear ratio $T_{RS}$ takes 0.5. Therefore, the compatibility $\beta T$ of the subject "the teaching gear ratio is set to $T_{RS}$ for the input value $X_i$" can be computed by the equation (30):

$$\beta_T = \min\{\mu_x(X_i), \mu_T(T_{RS})\} \quad (30)$$

Moreover, the learning degree, i.e., the compatibility (as will be called the "compatibility of the tolerance error $\epsilon'(X)$") y, in which the error $E_P$ is converged to the tolerance error $\epsilon'(X)$, is expressed by the propriety $\alpha_T$ of the teaching gear ratio $T_{RS}$ and the compatibility $\beta_T$ as follows in equation (31):

$$y = \min(\alpha_T, \beta_T) \quad (31)$$

Therefore, the intrinsic set error $\epsilon(=E_o)$ is corrected by the compatibility y of the tolerance error (X), and this tolerance error $\epsilon'(X)$ is set by the following equation (32), as plotted by the curve of FIG. 7:

$$\epsilon'(X) = \epsilon \cdot \{(1-y)^2 + 1\} \quad (32)$$

Thus, the neural network 11 learns till the following relationship (equation (33)) is satisfied:

$$E_P \rightarrow \epsilon'(X) \quad (33)$$

In the pattern producing means 20, the input values $X_i$ along with the teaching input values X, which values X are relatively close to the input values $X_i$ as indicated in equation 34, are used to produce learning pattern $P_n$ on the basis of the teaching input values X:

$$X = X_i + \Delta X_n \quad (34)$$

Specifically, the teaching input value X and the teaching gear ratio $T_{RS}$ are used as the teaching signals to produce the learning pattern $P_n$ for converging the error $E_P$ into the tolerance error $\epsilon'(X)$.

In the back propagation means 27, the teaching input value X, the teaching gear ratio $T_{RS}$ and the gear ratio R are input to correct the combined load factors $V_{ji}$ and $W_{kj}$ of the neural network 11 so that the error $E_P$ may be converged into the tolerance error $\epsilon'(X)$. The convergence of the error $E_P$ into the tolerance error $\epsilon'(X)$ is decided by a converging condition. Specifically, it is decided that the error $E_P$ is converged into the tolerance error $\epsilon'(X)$, when the sum $E_t$ of the error $E_P$ is minimized for a predetermined time period while the neural network 11 is learning.

The convergence can also be decided when a sum $E_t'$, as expressed by the Equation (35), becomes smaller than the convergence value $\epsilon_t$:

$$E_t = \Sigma \frac{E_P}{\epsilon'(X)} \quad (35)$$

Moreover, the combined load factors $V_{ji}$ and $W_{kj}$ from the back propagation means 27 along the offset quantities $\gamma_j$ and $\theta_k$ as expressed in equations (36) through (43)

$$\delta_k = T_{RS} - R \quad (36)$$

$$\delta^k = 2\delta_k R(1-R)/u_o \quad (37)$$

$$\sigma_j = \Sigma \delta_k W_{kj}^t \quad (38)$$

$$\sigma^j = 2\sigma_j H_j(1 - H_j)/u_o \quad (39)$$

$$W_{kj}^{t+1} = W_{kj}^t + \alpha_j \frac{\partial E_P}{\partial W_{kj}^t} = W_{kj}^t + \alpha_j \delta^k H_j \quad (40)$$

$$\theta_k^{t+1} = \theta_k^t + \beta_j \frac{\partial E_P}{\partial \theta_k^t} = \theta_k^t + \beta_j \delta^k \quad (41)$$

$$V_{ji}^{t+1} = V_{ji}^t + \alpha_i \frac{\partial E_P}{\partial W_{ji}^t} = V_{ji}^t + \alpha_i \delta^j I_i \quad (42)$$

$$\gamma_j^{t+1} = \gamma_j^t + \beta_i \frac{\partial E_P}{\partial \gamma_j^t} = \gamma_j^t + \beta_i \sigma^j \quad (43)$$

$H_j$ designates the output $f(J_i)$ of the intermediate layer. The superscript t appearing in the individual Equations (38) and (40) through (43) indicates that the correspondingly marked load factors $V_{ji}$ and $W_{kj}$ and quantities of offset $\gamma_j$ and $\theta_k$ are those before correction, and superscript (t+1) appearing in the individual Equations (40) through (43) indicates that the correspondingly marked loads $V_{ji}$ and $W_{kj}$ and quantities of offset $\gamma_j$ and $\theta_k$ are those after correction.

In the case of the correction moment method, the combined load $W_{kj}$ can be given by the equation (44):

$$W_{kj}^{t+1} = W_{kj}^t + \left[\alpha_j \cdot \frac{\partial E_P}{\partial W_{kj}^t} \, m^t (W_{kj}^t - W_{kj}^{t-1})\right] \quad (44)$$

where $m^t = t^{t-1} + \Delta m$ and $m^t < 0.9$.

In an example of the present control system for the automatic transmission, the acceleration opening A, the accelerator operating speed dA, the vehicle speed v and the acceleration dv are selected as the detected values of the input value $X_i$ and are set to the following values:

A=50 [%];

dA=12 [%/s];

v=70 [km/h];

and dv=20 [m/s$^2$].

Next, the input values $X_i$ are normalized by equations (4), (8), (7) and (11), as follows:

$$X_1 = A[\%]/100[\%] = 50/100 = 0.5; \quad (4)$$

$$X_2=dA[\%/s]/60[\%/s]=12/60=0.2; \quad (8)$$

$$X_3=v[km/h]/210[km/h]=70/210=0.3; \quad (7)$$

and $$X_4=dv[m/s^2]/40[m/s^2]=20/40=0.5. \quad (11)$$

Subsequently, the normalized input values $X_i$ are input to the neural network 11 (as shown in FIG. 1). This neural network 11 performs the neuro-computations using equations (16), (17), and (18) from the input values $X_i$, as follows:

$$I_i = X_i \quad (16)$$

for i=1 to 4;

$$J_j = \sum_{i=1}^{4} V_{ji} I_i + \gamma_j \quad (17)$$

for j=1 to 4; and $$K = \sum_{j=1}^{4} V_{kj} f(J_j) + \theta_k \quad (18)$$

In this case, the coefficient of gradient $u_o$ of the sigmoid function f(x) is set to 0.4.

If the gear ratio R output as the output signal K of the output layer has the following value:

R=2.1, the gear stage G having the gear ratio R set to 2.1 is determined in the gear stage converting means 12, see FIG. 4. For this example, the degree of satisfaction $g_t$ of each gear stage is read for R=2.1, and it is determined that the 2nd speed gear has the highest degree of satisfaction $g_t$. Thus $g_t$ is maximized for 2nd gear to provide the gear stage G.

Figure 8:
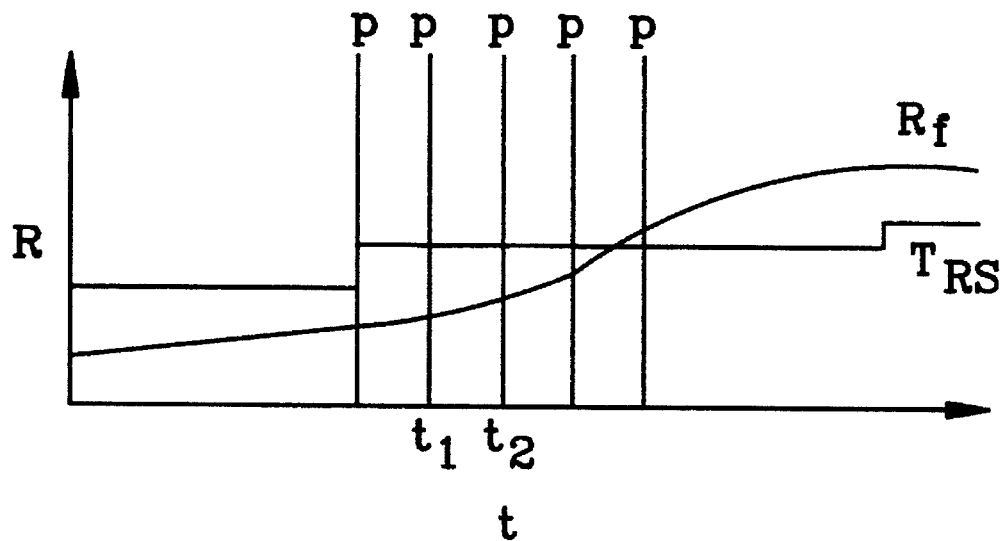
FIG. 8 is a diagram illustrating the relationship between the teaching gear ratio and a fuel economy optimizing gear ratio in the embodiment of FIGS. 1 and 2.
Figure 9:
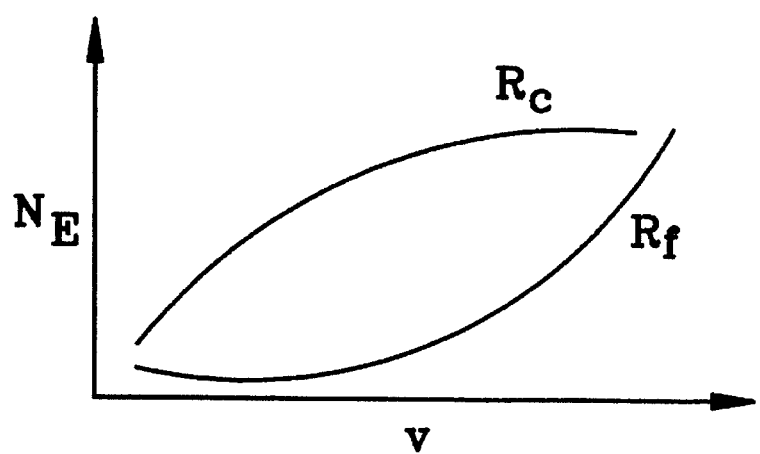
FIG. 9 is a diagram illustrating the characteristics of the fuel economy optimizing gear ratio and a comfort optimizing gear ratio.

Next, the propriety of the teaching gear ratio $T_{RS}$ is decided in the teaching gear ratio propriety decide means 28. In FIG. 8, the abscissa indicates the time t, and the ordinate indicates the gear ratio R. In FIG. 9, on the other hand, the abscissa indicates the vehicle speed v, and the ordinate indicates the R.P.M. ($N_E$) of the engine. In these Figures: $t_1$ designates the time at which the preceding learning pattern $P_n$ was produced; $t_2$ designates the present time; P designates the points in which the learning pattern $P_n$ is produced; $R_f$ designates the fuel economy optimizing gear ratio; $T_{RS}$ designates the teaching gear ratio; and $R_C$ designates the comfort optimizing gear ratio.

Solving the individual equations (22), (23) and (24), the fuel economy matching degree $M_f$, the driving force matching degree $M_F$ and the comfort matching degree $M_C$ are computed.

$$M_f = \int_{t_1}^{t_2} |T_{RS} - R_f| dt / M_{fmax} = 0.5 \quad (22)$$

$$M_F = \int_{t_1}^{t_2} \left( \frac{Adv}{\Delta A} \cdot \frac{dv + DR/w}{A} \right) dt / M_{Fmax} = 0.9 \quad (23)$$

$$M_C = \int_{t_1}^{t_2} |T_{RS} - R_C| dt / M_{Cmax} = 0.6 \quad (24)$$

Using equation (25), the propriety $\alpha_T$ of the teaching gear ratio $T_{RS}$ is computed, as follows:

$$\alpha_T = \max(1 - M_f, M_F, 1 - M_C) = \max(0.5, 0.9, 0.4) = 0.9 \quad (25)$$

The compatibility $\mu_x(X_i)$ of the input values $X_i$ is computed using the equation (26):

$$\mu_x(X_i) = 1 - \frac{1}{1 + \left( \frac{C_x}{X_1 - X} \right)^2} \quad (26)$$

FIG. 10 is a diagram presenting the compatibility of the input value when the detected value is exemplified by the acceleration opening, and FIG. 11 is a diagram presenting the compatibility of the input value when the detected value is exemplified by the vehicle speed. In these Figures: $A_1$ to $A_6$ designate the input value $X_i$ and its peripheral values when the detected value is exemplified by the accelerator opening A; $\mu_A(A)$ designates the compatibility of the input value $X_i$ when the detected value are exemplified by the accelerator opening A; $v_1$ to $v_6$ designates the input value $X_i$ and its peripheral values when the detected value is exemplified by the vehicle speed v; and $\mu_v(v)$ designates the compatibility of the input value $X_i$ when the detected value is exemplified by the vehicle speed v.

FIG. 10 enumerates the result of computations of the compatibility $\mu_A(A)$ of the input value $X_i$ for the constant $C_x=15$ and the accelerator opening A=50 [%]. On the other hand, FIG. 11 enumerates the result of computations of the compatibility $\mu_v(v)$ of the input value $X_i$ for the constant $C_x=16$ and the vehicle speed v=70 [km/h].

Likewise, the compatibility $\mu_{dA}(dA)$ of the input value $X_i$ when the detected value is exemplified by the accelerator operating speed dA and the compatibility $\mu_{dv}(dv)$ of the input value $X_i$ when the detected value is exemplified by the acceleration dv are computed, and the teaching input value X is determined to satisfy the following relationship:

$\mu_x(X_i) > 0.5$.

In the cases of FIGS. 10 and 11, for example, the learning data are composed of the following combination:

$(A_2, A_3, A_4) \cdot (v_2, v_3, v_4)$.

If the teaching gear ratio $T_{RS}$ is at 1.418, the gear ratio R or the output signal K of the neural network 11 takes the value of 2.1 so that the error $E_P$ is expressed by the following equation (45):

$$E_P = (R - T_{RS})^2 / 2 = 0.23 \quad 45$$

Therefore, the compatibility $\mu_T(T_{RS})$ of the teaching gear ratio $T_{RS}$ is calculated using equations (28) and (29):

$$\mu_T(T_{RS}) = 1 - \frac{1}{1 + \left( \frac{C_{TR}}{E_o - E_P} \right)^2} = \quad (28)$$

$$1 - \frac{1}{1 + \left( \frac{0.05}{0.2 - 0.23} \right)^2} = 0.735$$

The error $E_P$ has its minimum $E_o$ set at 0.2, and the constant $C_{TR}$ is set at 0.05.

Using equation (30), the compatibility $\beta_T$ of the subject, "the teaching gear ratio is set to $T_{RS}$ for the input value $X_i$," is calculated as follows:

$$\beta_T = \min\{\mu_A(A), \mu_v(v), \mu_{dA}(dA), \mu_{dv}(dv), \mu_T(T_{RS})\} \quad (30)$$

Here the compatibility $\beta_T$ of the subject with the detected values is limited to the accelerator opening A and the vehicle speed v and equation (30) is simplified as follows:

$$\beta_T \min\{\mu_A(A), \mu_v(v), \mu_T(T_{RS})\} \quad (30)$$

In FIG. 12, $A_2$ to $A_4$ designate the teaching input value S when the detected value is exemplified by the accelerator opening A; $v_2$ to $v_4$ designate the input value X when the detected value is exemplified by the vehicle speed v; and $A_3$ and $v_3$ designate the input value $X_i$.

Using equation (31), the compatibility y of the tolerance error $\epsilon'(X)$, in which the error $E_P$ is converged into the $\epsilon'(X)$, is computed in the following manner:

$$y = \min(\alpha_T, \beta_T) = \min(0.735, 0.9) = 0.735 \tag{31}$$

The tolerance error $\epsilon'(X)$ is computed using equation (32) in the following manner:

$$\epsilon'(A_3, v_3) = \epsilon \cdot \{(1-y)^2 + 1\} = 0.2 \times \{(1-0.735)^2 + 1\} = 0.214 \tag{32}$$

The neural network 11 (as shown in FIG. 1) learns through the back propagation means 27. As the neighborhood values of the input values $(A_3, V_3)$, the learning pattern $P_n$ is also produced, as follows:

$\epsilon'(A_2, V_2) = 0.219$;

and $\epsilon'(A_3, v_2) = 0.217$.

Thus, the learning pattern $P_n\{A_3, v_3, T_{RS}, \epsilon'(X)\}$ is produced, as exemplified in the following:

Input Value $(A_3, v_3)$
→$P_1$ (50, 70, 1.418, 0.214);
Neighborhood Value $(A_2, v_2)$
→$P_1$ (40, 60, 1.418, 0.219);
Neighborhood Value $(A_3, v_2)$
→$P_1$ (50, 60, 1.418, 0.217);
Neighborhood Value $(A_4, v_2)$
→$P_1$ (60, 60, 1.418, 0.219); and
Neighborhood Value $(A_2, v_3)$
→$P_1$ (40, 70, 1.418, 0.219).

When this learning pattern $P_n$ is input to the back propagation means 27, the combined load factors $V_{ji}$ and $W_{kj}$ are so corrected that the error $E_P$ between the gear ratio R and the teaching gear ratio $T_{RS}$ may be converged to the tolerance error $\epsilon'(X)$.

Figure 13:
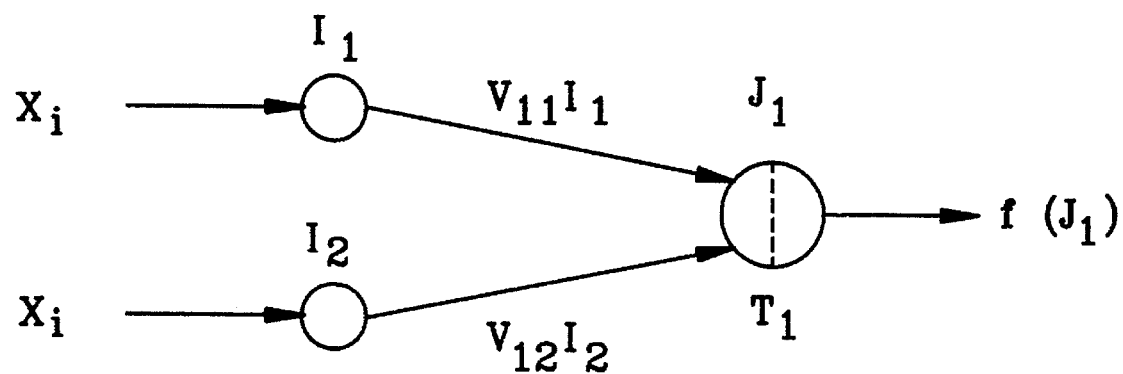
FIG. 13 is a first diagram showing the neuro-computation of the neural network in the embodiment of FIGS. 1 and 2.
Figure 14:
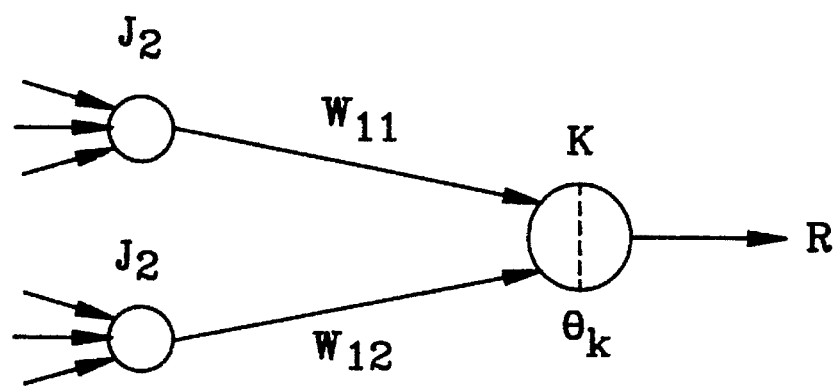
FIG. 14 is a second diagram showing the neuro-computation of the neural network in the embodiment of FIGS. 1 and 2.

FIG. 13 shows the neuro-computation of the first layer in the neural network, and FIG. 14 shows the neuro-computation in the second layer of the neural network. First of all, the input signals $I_j$ to the intermediate layer and the input signal $J_j$ to the output layer are computed as follows wherein $X_1 = 0.5$, $X_2 = 0.2$, and $(V_{11}, V_{12}, \gamma_1) = (0.3, 0.4, 0.5)$ $$I_1 = X_1 = 0.5 \tag{16}$$

$$I_2 = X_2 = 0.2 \tag{16}$$

$$J_1 = \sum_{i=1}^{2} V_{1i} I_i + \gamma_1 = 0.3 \times 0.5 + 0.4 \times 0.2 + 0.5 = 0.73 \tag{17}$$

$$f(J_1) = \frac{1}{1 + \exp\left(\frac{-J_1}{u_o}\right)} = \frac{1}{1 + \exp\left(\frac{-0.73}{0.4}\right)} = 0.863 \tag{20}$$

$X_1$ and $X_2$ designate the values of the input value $X_1$; $V_{11}$ and $V_{12}$ designate the values of the combined load $V_{ji}$; and $\gamma_1$ designates the value of the quantity of offset $\gamma_j$.

Then, the output signal K of the output layer is computed using equation (18) wherein $f(J_1) = 0.863$, $f(J_2) = 0.75$, and $(W_{11}, W_{12}, \theta) = (0.9, 0.8, 0.7)$, $$K = \sum_{j=1}^{2} W_{kj} f(J_j) + \theta_k = 0.7 \times 0.863 + 0.8 \times 0.75 = 2.0767 \tag{18}$$

$W_{11}$ and $W_{12}$ designate the values of the combined load $W_{kj}$. Hence, the gear ratio R is computed by:

R = K = 2.0767.

When the gear ratio R is thus computed, its difference $E_P$ from the teaching gear ratio $T_{RS}$ is computed, and the back propagation means 27 (as shown in FIG. 1) corrects the combined loads $V_{ji}$ and $W_{kj}$ until the converging condition is satisfied by the result of equation (35) becoming less than $\epsilon_t$:

$$E_t = \Sigma \frac{E_P}{\epsilon_P} < \epsilon_t = 0.99 \tag{35}$$

In this case, it is the converging condition that the sum $E_t'$ of the values, which are computed by dividing the errors $E_P$ of the individual learning patterns $P_n$ by the individual tolerance errors $\epsilon'(X)$ is smaller than the converged value $\epsilon_t$. Then, the learning is ended by the neural network 11 when the error $E_P$ is converged into each tolerance error $\epsilon'X$.

The present invention is not limited to the foregoing described embodiment but could be modified in various manners in accordance with the gist of the invention, and such modifications are not to be excluded from the scope of the present invention.

What is claimed is:

1. A control system for an automatic transmission for a vehicle having teaching and automatic modes wherein a driver manually selects a shift to a gear stage during the teaching mode and wherein changes in running conditions of the vehicle cause a shift during the automatic mode, comprising:

sensor means for detecting a plurality of running conditions of the vehicle to produce corresponding detected running condition values;

a neural network adapted to receive the plurality of detected running condition values from said sensor means and to output an automatic gear ratio derived from said plurality of detected running condition values by weighing with combined load factors;

gear stage converting means for converting the automatic gear ratio output from said neural network into an automatic gear stage demand;

manual shift selection means for operation by the driver to select a teaching gear stage demand;

mode switch means for selecting either the teaching mode in which a shift is performed in response to the teaching gear stage demand or the automatic mode in which the shift is performed in response to the automatic gear stage demand;

gear ratio converting means for converting the teaching gear stage demand into a teaching gear ratio;

tolerance error computing means for computing a tolerance error for correction of the combined load factors of said neural network on the basis of at least one of a propriety of the teaching gear ratio, a compatibility of said running condition values received by said neural network, and a compatibility of the teaching gear ratio;

pattern producing means for producing a learning pattern which is composed of said running condition values, said teaching gear ratio and said tolerance error; and combined load factor correcting means for correcting the combined load factors of said neural network on the basis of the learning pattern of said pattern producing means.

2. A control system for an automatic transmission according to claim 1, wherein said tolerance error computing means computes said tolerance error on the basis of the propriety of said teaching gear ratio, and wherein the propriety of said teaching gear ratio is computed from a fuel economy matching degree indicating a degree of deterioration of a fuel economy and a driving force matching degree indicating a level of acceleration of the vehicle.

3. A control system for an automatic transmission according to claim 1, wherein said tolerance error computing means computes said tolerance error on the basis of the compatibility of said running condition values, and wherein the compatibility of said running condition values is computed from a difference from reference values.

4. A control system for an automatic transmission according to claim 1, wherein said tolerance error computing means computes said tolerance error on the basis of the compatibility of said teaching gear ratio, and wherein the compatibility of said teaching gear ratio is computed from a difference of said automatic gear ratio of said neural network from said teaching gear ratio when the teaching gear stage is selected.

5. A control system for an automatic transmission according to claim 1, wherein said tolerance error computing means computes said tolerance error on the basis of the propriety of said teaching gear stage, the compatibility of said running condition values and the compatibility of said teaching gear ratio, wherein the propriety of said teaching gear stage is computed from a fuel economy matching degree indicating a degree of deterioration of a fuel economy and a driving force matching degree indicating a level of acceleration of the vehicle, wherein the compatibility of said running condition values is computed from a difference from reference values, and wherein the compatibility of said teaching gear ratio is computed from a difference of said automatic gear ratio of said neural network from said teaching gear ratio when the teaching gear stage is selected.

* * * * *

UNITED STATES PATENT AND TRADEMARK OFFICE
CERTIFICATE OF CORRECTION

PATENT NO. : 5,519,610
DATED : May 21, 1996
INVENTOR(S) : TSUTSUI et al

It is certified that error appears in the above-indentified patent and that said Letters Patent is hereby corrected as shown below:

Col. 5, line 47, "ear" should read --gear--.

Col. 9, line 29, "<" should read -->--.

Col. 13, line 43, "$I_j$" should read --$I_i$--.

Signed and Sealed this

Fifteenth Day of April, 1997

Attest:

BRUCE LEHMAN

*Attesting Officer*        *Commissioner of Patents and Trademarks*